June 21, 1932. C. W. KELLY 1,864,357
THERMOSTATIC RELEASING MEANS FOR SELF CLOSING VENTILATORS
Filed July 14, 1930 2 Sheets-Sheet 1

INVENTOR
Clyde W. Kelly

BY
Whittemore Hulbert Whittemore Belknap
ATTORNEYS

June 21, 1932.    C. W. KELLY    1,864,357
THERMOSTATIC RELEASING MEANS FOR SELF CLOSING VENTILATORS
Filed July 14, 1930    2 Sheets-Sheet 2
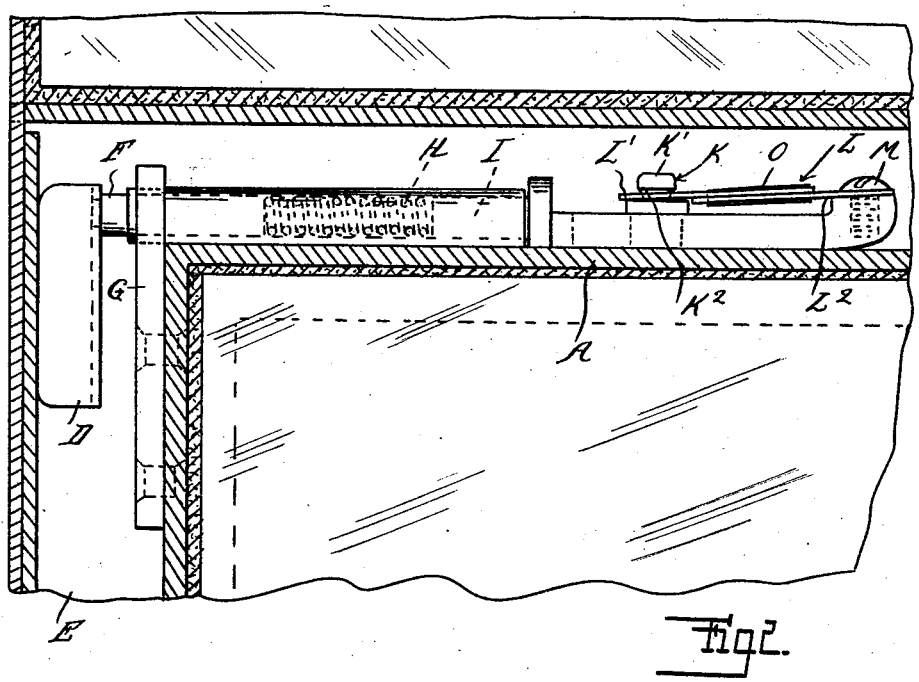
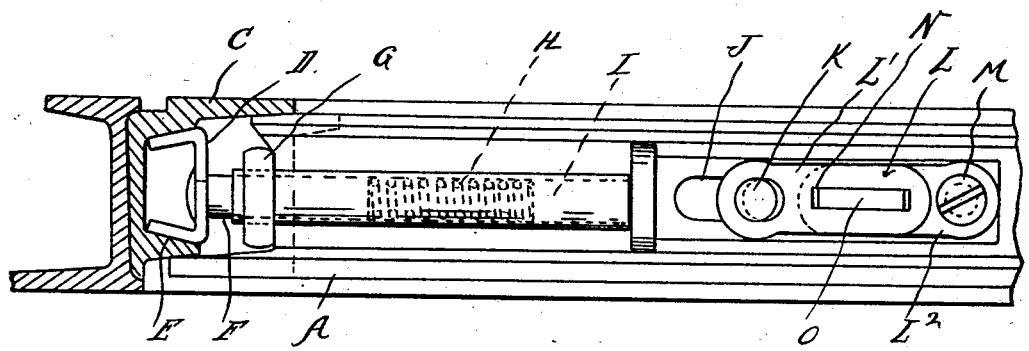
INVENTOR
Clyde W. Kelly
BY
ATTORNEYS Patented June 21, 1932

1,864,357

UNITED STATES PATENT OFFICE

CLYDE W. KELLY, OF DETROIT, MICHIGAN, ASSIGNOR TO DETROIT STEEL PRODUCTS COMPANY, OF DETROIT, MICHIGAN, A CORPORATION OF MICHIGAN

THERMOSTATIC RELEASING MEANS FOR SELF-CLOSING VENTILATORS

Application filed July 14, 1930. Serial No. 467,919.

The invention relates to ventilator window sashes which are so constructed as to automatically close when released and are maintained in open position by friction means. It is the object of the invention to obtain a novel construction in which the release of such friction means is automatically accomplished in case of fire so as to cut off air draft to the interior of the building. To this end the invention consists in the novel construction of a thermostatically controlled releasing means as hereinafter set forth. In the drawings:

Figure 2 is a section on line 2—2 of Figure 1 showing the friction shoe for holding the ventilator open and the thermostatically releasing means;

Figure 3 is a top plan view of the sash, friction shoe and releasing means.

Figure 1:
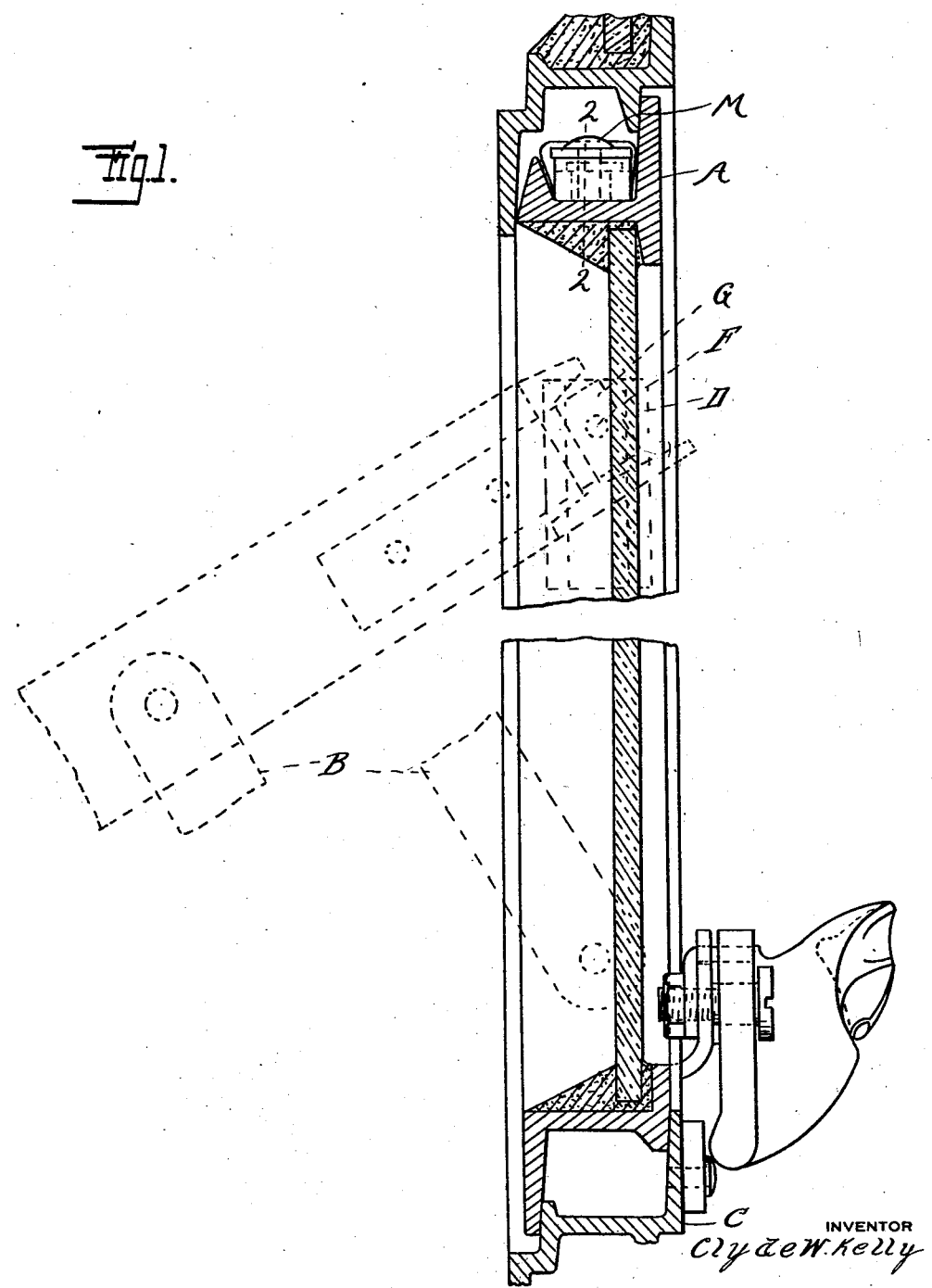
Figure 1 is a vertical section through a window ventilator showing it in closed position in full lines and in open position in dotted lines.

The ventilator to which my improvements are applied may be of any suitable construction, but as specifically shown comprises the window ventilator sash A which is connected by balance arms B on opposite sides thereof to the window frame C. The sash is also connected to the frame by a shoe D slidable in a channel E in the side bars of the frame and connected by the pivot F to a pivot socket G on the upper rail of the sash. The shoe D is wedge shaped and engages a channel of corresponding cross section so that when pressed into said channel it will frictionally resist sliding movement. The pressure is furnished by a spring H arranged to bear against the end of the pivot F and having its other end abutting against a stop I. Thus whenever the ventilator is open the friction developed by the shoe in the channel E will be sufficient to retain said ventilator in open position against the tendency to automatically close by gravity.

To effect an automatic release of the friction lock in case of fire it is necessary to use some fusible connection which would be released at a relatively low temperature. On the other hand, it is desirable to retain the friction locking means of sufficient strength so as not to become inoperative under normal usage. Certain thermostatically controlled release devices which have heretofore been used have been defective in this latter respect, for in order to release under heat the fusible element employed has greatly weakened the structure in withstanding normal stresses to which it is subjected. I have therefore devised a construction which normally possesses all the strength required to withstand any stress to which it is subjected but which upon a slight rise in temperature will release the tension of the spring so as to permit the free sliding of the shoes D and the automatic closing of the ventilator.

My improved construction comprises a slotted member J to which the abutment I is attached and which slidably engages a headed pin K secured to the upper sash rail and passing through the slot. To hold the member J from sliding on the pin K, a link L is connected at one end to the pin K and at its outer end is connected by the screw M to the outer end of the member J. The link L is formed of two members L' and L² which overlap each other and are secured by a low fusing solder. These members are also provided with registering slots N in which is placed a key member O also held in place by the low fusing solder. The normal stresses are not, however, carried to any appreciable extent through the solder connection but are transmitted from the member L', L² through the key O to the member L². Thus the structure will have all the required strength for ordinary uses. On the other hand whenever the temperature is elevated to the fusing point of the soft solder, the members L and L' will be disconnected from each other and from the key O permitting the latter to fall out and thereby permitting the sliding of the member J on the pin K and the releasing of the tension of the spring H. This will at once release the ventilator so that it will automatically close by gravity.

To insure positive action of this releasing means I arrange the link L at a slight angle to the line of thrust by attaching the screw M to an upwardly extending boss J' that is slightly higher than the head of the pin K. This difference in angle between the line of the link and the line of the slide J will upon the melting of the solder cause the members L and L² to move apart, thereby insuring the disengagement of the key O.

To make the fusible link L readily replaceable it is engaged with a pin K by an upward projection K' having an under-cut groove K². The link member L' has an aperture which will fit over the projection K' but under tension will draw in to the groove K² which holds it from disengagement.

What I claim as my invention is:

1. The combination with a self-closing ventilator, friction means for holding said ventilator in open position and a resilient member for developing the friction in said means, of a slidable member forming an abutment for said resilient member, of a fixed abutment member, and a link between said slidable and fixed abutments, said link being formed of a plurality of rigid members held in interlocking engagement by a fusible solder.

2. The combination with an automatically closing window ventilator and friction means for normally holding said ventilator in open position including a spring for developing friction, of a thermostatically operated releasing means for the spring tension comprising a member forming an abutment for said spring, a fixed abutment, a link between said movable and fixed abutments formed of a plurality of members in interlocking engagement, and of sufficient rigidity when thus engaged to transmit normal stresses between said movable and fixed abutments and a fusible solder for holding said members in interlocking engagement.

3. The combination with an automatically closing ventilator and friction means for normally holding the same in open position including a spring for developing the friction, of releasing means comprising a movable abutment for said spring, a fixed abutment, a link connecting said movable and fixed abutments comprising overlapping members having registering slots, a key in said registering slots, for preventing relative movement of said members, and a fusible solder connection between said members and key.

4. The combination with a stationary frame and a ventilator having a swinging link connection to said frame and a slidable pivoted friction shoe for permitting the opening of the ventilator and normally holding the same in open position, of a spring bearing against the pivot of said shoe and developing the required pressure for friction, a movable abutment for said spring, a fixed abutment and a link between said movable and fixed abutments including two overlapping members arranged in slightly angular relation to the line of thrust between said abutments, said overlapping members having registering slots, a key member in said registering slots for transmitting stresses from the one to the other, and a low fusing solder for securing said members and key in engagement with each other adapted on the fusing of the solder to permit disengagement of the same.

5. The combination with a self closing ventilator, including a sliding friction shoe pivotally attached to the ventilator sash, and a spring in alignment with said pivot for normally developing sufficient friction on said shoe to prevent closing of the ventilator, of automatic releasing means comprising a slidable abutment for said spring in alignment with said pivot, a fixed abutment, a link between said slidable and fixed abutments composed of two overlapping members having registering slots, a key in said slot and a fusible solder attaching said member and key for the purpose described.

6. The combination with a self closing ventilator including a slidable friction shoe pivotally attached to the ventilator sash, of a tubular socket in which said pivot is journalled, a spring within said socket bearing against said pivot for developing a friction for holding the ventilator from closing, an abutment for said spring engaging said tubular socket and having a portion lying adjacent to a rail of said sash, a pin secured to the sash rail and engaging a slot in the portion of said abutment adjacent thereto, a link having one end engageable with said pin and the opposite end engageable with said abutment member, said link being formed of a plurality of overlapping sections with a shouldered engagement for resisting stresses longitudinally of the link and a soft solder connection between said members.

7. The combination with a self-closing ventilator, friction means for holding said ventilator in open position and a resilient member for developing the friction of said means, of a slidable member forming an abutment for said resilient member, a fixed abutment member, a link between said slidable and fixed abutments, said link being formed of a plurality of overlapping sections having a shouldered engagement for resisting stresses longitudinally of the link and a fusible connection between said members.

8. The combination with a self-closing ventilator, friction means for holding said ventilator in open position and a resilient member for developing the friction of said means, of a slidable member forming an abutment for said resilient member, a fixed abutment engaging a slot in said slidable abutment, and means including a fusible connection between said slidable and fixed abutments for normally preventing sliding movement of the former.

9. The combination with a self-closing ventilator, friction means for holding said ventilator in open position and resilient means for developing the friction of said first-named means, of a slotted member slidable on the ventilator sash forming an abutment for said resilient means, a pin secured to the sash and engaging the slot in said abutment member, a link having one end engageable with said pin and the opposite end engageable with said abutment member, said link being formed of a plurality of overlapping sections having a shouldered engagement for resisting stresses longitudinally of the link, and a fusible connection between said members.

In testimony whereof I affix my signature.

CLYDE W. KELLY.